United States Patent [19]

Cameron et al.

[11] Patent Number: 5,566,095
[45] Date of Patent: Oct. 15, 1996

[54] FAST CALIBRATION USING MICROSTEPS

[75] Inventors: T. Jay Cameron, Scotts Valley; Duc T. Phan, Saratoga, both of Calif.

[73] Assignee: Seagate Technology, Inc., Scotts Valley, Calif.

[21] Appl. No.: 483,473

[22] Filed: Jun. 7, 1995

Related U.S. Application Data

[63] Continuation of Ser. No. 216,010, Mar. 21, 1994, Pat. No. 5,473,550.

[51] Int. Cl.$^6$ .................................................. G11B 5/596
[52] U.S. Cl. .......................... 364/571.01; 360/78.09; 369/44.29; 369/44.35
[58] Field of Search ......................... 364/571.01, 571.05, 364/550, 724.16, 724.19; 369/44.29, 44.35; 360/75, 78.04, 78.06, 78.07, 78.09, 106; 371/21.2, 21.3, 24, 67.1; 395/275, 425; 318/608, 632

[56] References Cited

U.S. PATENT DOCUMENTS

| | | | |
|---|---|---|---|
| 4,419,701 | 12/1983 | Harrison et al. | 360/77.08 |
| 4,679,103 | 7/1987 | Workman | 360/78.07 |
| 4,697,127 | 9/1987 | Stich et al. | 360/78.09 |
| 4,835,633 | 5/1989 | Edel et al. | 360/78.04 |
| 4,914,644 | 4/1990 | Chen et al. | 360/78.09 |
| 5,119,248 | 6/1992 | Bizjak et al. | 360/75 |
| 5,119,254 | 6/1992 | Brown et al. | 360/106 |
| 5,126,897 | 6/1992 | Ogawa et al. | 360/78.09 |
| 5,227,930 | 7/1993 | Thanos et al. | 360/78.04 |
| 5,258,940 | 11/1993 | Coker et al. | 364/724.16 |
| 5,268,848 | 12/1993 | Coker et al. | 364/724.19 |
| 5,305,160 | 4/1994 | Funches et al. | 360/78.07 |
| 5,309,075 | 5/1994 | Yokoe et al. | 318/608 |
| 5,313,589 | 5/1994 | Donaldson et al. | 395/275 |
| 5,333,140 | 7/1994 | Moraru et al. | 360/75 |
| 5,473,550 | 12/1995 | Cameron et al. | 364/571.01 |

*Primary Examiner*—Emanuel T. Voeltz
*Assistant Examiner*—Edward Pipala
*Attorney, Agent, or Firm*—LaRiviere, Grubman & Payne

[57] ABSTRACT

A direct access storage device (DASD) employs a servo including a digital signal processor having a software switch (DSP). The DSP is provided with DSP code in a DSP code space. One of the functions of the DSP code is to implement the microstep calibration of the present invention. Microstep calibration is accomplished by a step change of head position within a single track. In head position 1 the head is at the center of the track in track follow mode. From head position 2 to head position 3, an offset command causes the servo to move the head slightly off center. From head position 3 to head position 4, the servo is disabled by opening the software switch in the DSP. The position delta, delta 3–4, of the head is recorded. From position 4 to position 6, the servo is still disabled and a step of current is applied to the VCM to determine position delta 2. From position 7 to position 8, the servo is still disabled and two steps of VCM current are applied to recover to the offset position. From position 9 to position 10, the servo is enabled by operating the software switch within the DSP with the offset still applied and the result is that the offset position is re-established. Delta 3–4 and delta 4–6 are used to determine the system gain. The measured gain is applied to the DSP as a kgain parameter which is used by the DSP to correct for variation and measured system gain.

6 Claims, 7 Drawing Sheets

FAST CALIBRATION USING MICROSTEPS

This is a continuation of application Ser. No. 08/216,010, filed Mar. 21, 1994, now U.S. Pat. No. 5,473,550.

TECHNICAL FIELD

The present invention relates to direct access storage devices (DASD) and, more particularly to a fast method of calibrating the system gain for DASD servos.

BACKGROUND ART

In some prior art disk drive servos, a calibration system referred to as sine calibration, or sinecal, is used to calibrate the system gain. The sinecal method operates with a closed loop servo system having a system control signal, a system gain and an actuator. In operation, the sinecal calibration system injects a single frequency sinusoid signal into the servo system so that the sinusoid signal is added to the system control signal. Then the control signal and the added sinusold signal are multiplied by the sinusoid signal to generate a first product signal. The actuator position is measured. Then the measured actuator position is multiplied by the sinusoid value to generate a second product signal. The first product signal is low pass filtered to generate a first filtered signal, and the second product signal is low pass filtered to generate a second filtered signal. The second filtered signal is divided by the first filtered signal to generate an identification ratio which is proportional to the measured system gain.

A new calibrated system gain adjustment factor is determined as a function of the identification ratio. The previous system gain adjustment factor is replaced by the new calibrated system gain adjustment factor. The control signal is multiplied by the new calibrated system gain adjustment factor to obtain an adjusted control signal. The result is that the control system automatically compensates for bias forces and adapts to changes in effective system gain.

The sinecal system described above is more than satisfactory for the DASD for which it was designed. Ordinarily, the DASD is powered up at the beginning of the work day, calibrated, and operated all day until powered down. Smaller computer platforms that are battery operated operate in a different mode. As a power saving measure, the smaller computer platforms are powered down many times during the work day, and are re-calibrated every time they are powered up. The smaller computer platforms use smaller drives, and it has been found that the sinecal calibration system is not appropriate for these smaller drives. During the early development of a smaller disk drive, attempts were made to use the sinecal method of calibration. Sinecal had several problems in the smaller head disk assembly (HDA).

The principal problem with sinecal is the time required for measurement. It was taking 1.5 seconds for each measurement and the new smaller HDA required two measurements. This meant a calibration time of three seconds, which was unacceptable for this product if repeated re-calibration occurred, as would be the case with power saver features causing power down throughout the work day.

Other HDA's also would require more calibrations due to increases in the number of heads and the addition of gain zones to account for gain changes as a function of radial head position on the disk. Gain zones increase the number of calibrations for individual heads because each head requires one calibration for each zone. The maximum number of zones was set at six, and the maximum number of heads at eight. An HDA with eight heads and six zones would require 48 calibrations. Since each calibration requires 1.5 seconds, these 48 calibrations would take 72 seconds, assuming no retries. Significant reduction in the calibration time was needed.

DISCLOSURE OF INVENTION

In accordance with the present invention, there is provided a calibration system for DASD servos known as microstep calibration. Microstep calibration is a fast method of calibrating the system gain for DASD servos. Gain is measured utilizing a small incremental motion of the head. This motion is caused by a fixed integral of acceleration consisting of a fixed current step applied to the actuator, typically a voice coil motor (VCM), for a fixed time. The small micro motion is repeated at several angular positions on the same track until the average of the motions represents a good approximation of the system gain. This calibration is completed in a fraction of the time required by prior methods, and the simplicity of the approach has resulted in faster calibrations with less space requirements for computer code.

The calibration technique is applied by first positioning the head at the center of a track in track follow mode. Then, an offset command is applied to the processor to cause the servo to move the head slightly off center of the track. The servo is then disabled by opening a software switch. After a time delay, the change in position of the head is recorded as delta one. While maintaining the servo in a disabled condition, a step of current is applied to the VCM, and is held constant for a predetermined length of time. The change in position of the head is recorded as delta two. While maintaining the servo in a disabled condition, two steps of VCM current are applied to reposition the head to the offset position. The servo is enabled with the offset still applied by closing the software switch. This reestablishes the offset position. Then, the gain of the servo is computed by using delta one and delta two. The computed gain is applied to the processor as a calibration parameter.

Other features of the present invention are disclosed or apparent in the section entitled "BEST MODE FOR CARRYING OUT THE INVENTION."

BRIEF DESCRIPTION OF DRAWINGS

For a fuller understanding of the present invention, reference is made to the accompanying drawing taken in conjunction with the following detailed description of the Best Mode For Carrying Out The Invention. In the drawing.

Figure 1:
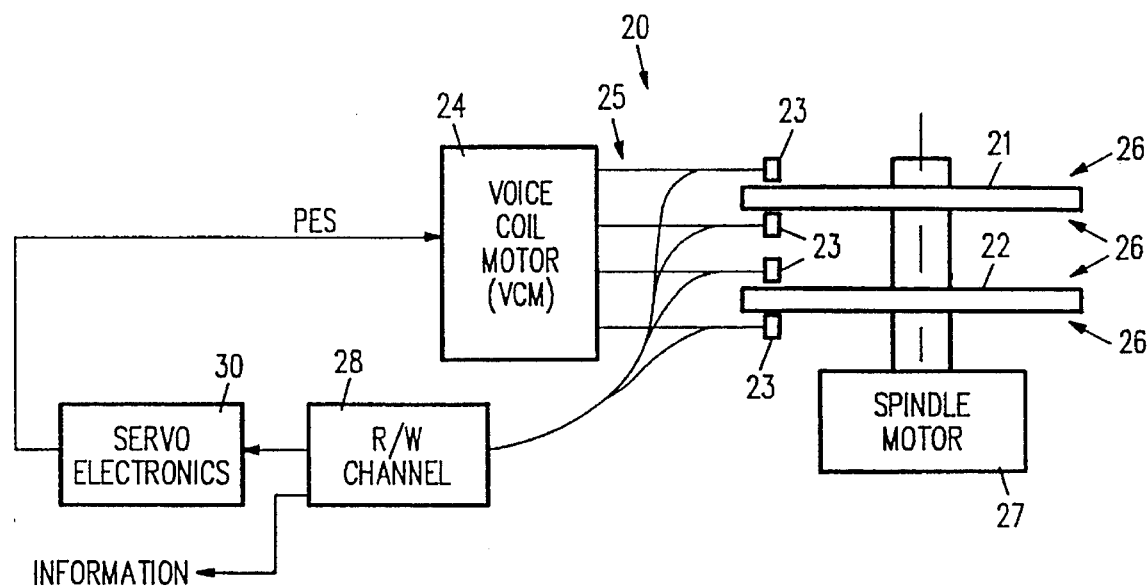
FIG. 1 is a simplified block diagram of a sector servo in accordance with the invention.

Reference numbers refer to the same or equivalent parts of the present invention throughout the several features of the drawing.

BEST MODE FOR CARRYING OUT THE INVENTION

As hard disk drives, disk surfaces, servo control systems, VCM actuators, and read/write heads are all known in the art, in order to avoid confusion while enabling those skilled in the art to practice the claimed invention, this specification omits many details with respect to those items.

Referring now to FIG. 1, there is shown a simplified block diagram of a sector servo in accordance with the present invention. Disk files 20 are information storage devices which utilize one or more rotatable disks 21, 22 with concentric data tracks containing information, one or more heads 23 for reading or writing data onto the various tracks, and an actuator or voice coil motor (VCM) 24 connected by a support arm assembly 25 to the head or heads 23 for moving one of the heads 23 to the desired track and maintaining it over the track centerline during read or write operations. Each disk 21, 22 has two data surfaces 26, and the disks 21, 22, being disposed on a spindle, are driven by a spindle motor 27. The read/write information is electrically coupled to and from the heads 23 by way of a read/write (R/W) channel 28. The R/W channel 28 may include amplifiers, filters and detectors.

The movement of the head 23 to a desired track is referred to as track accessing or "seeking", while the maintaining of the head 23 over the centerline of the desired track during a read or write operation is referred to as track "following". The actuator or VCM 24 typically comprises a coil movable through the magnetic field of a permanent magnetic stator. The application of current to the VCM 24 causes the coil, and thus the attached head 23, to move radially. The acceleration of the coil is proportional to the applied current, so that ideally there is no current to the coil if the head 23 is perfectly stationary over a desired track.

In disk files which have a relatively high density of data tracks on the disk, it is necessary to incorporate a servo control system to maintain the head precisely over the centerline of the desired track during read or write operations. This is accomplished by utilizing prerecorded servo information either on a dedicated servo disk or on sectors angularly spaced and interspersed among the data on a data disk. The servo information sensed by the read/write head (or the dedicated servo head if a dedicated servo disk is used) is demodulated to generate a position error signal (PES) which is an indication of the position error of the head away from the nearest track centerline.

There are many ways of obtaining the PES signal well known to those skilled in the art. For purposes of illustration, the present invention is shown as being used with a disk drive digital sector servo employing a pattern of servo information prerecorded on sectors interspersed among data on data disks. It should be understood that this is by way of example only, and that the invention is not limited to use with this particular method of obtaining the PES signal.

The prerecorded servo information is customarily written to the disks 21, 22 by a servowriter at the factory. The prerecorded servo information is read off the disks 21, 22 and is applied to the input of servo electronics 30 which drives the VCM 24.

Figure 2:
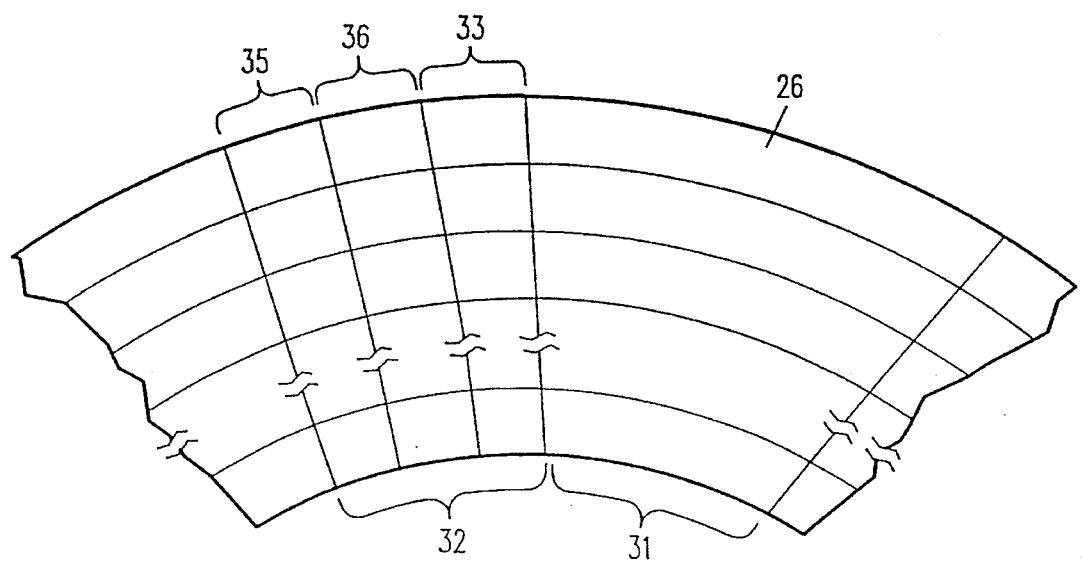
FIG. 2 is a broken fragmentary view of the recording surface of a portion of a disk useful in a disk drive in accordance with the invention, and indicating a sector servo pattern thereon.

Referring now to FIG. 2, there is shown a broken, fragmentary view of the recording data surface 26 of a portion of a disk 21, 22 that may be used in the present invention. The recording data surface 26 has a sector servo pattern thereon. The usable recording data surface 26 may be divided into a plurality of data storage sectors 31, and a plurality of servo information sectors 32. The servo information sectors 32 may be distributed around the disks 21, 22 between adjacent data storage sectors 31.

Figure 3:
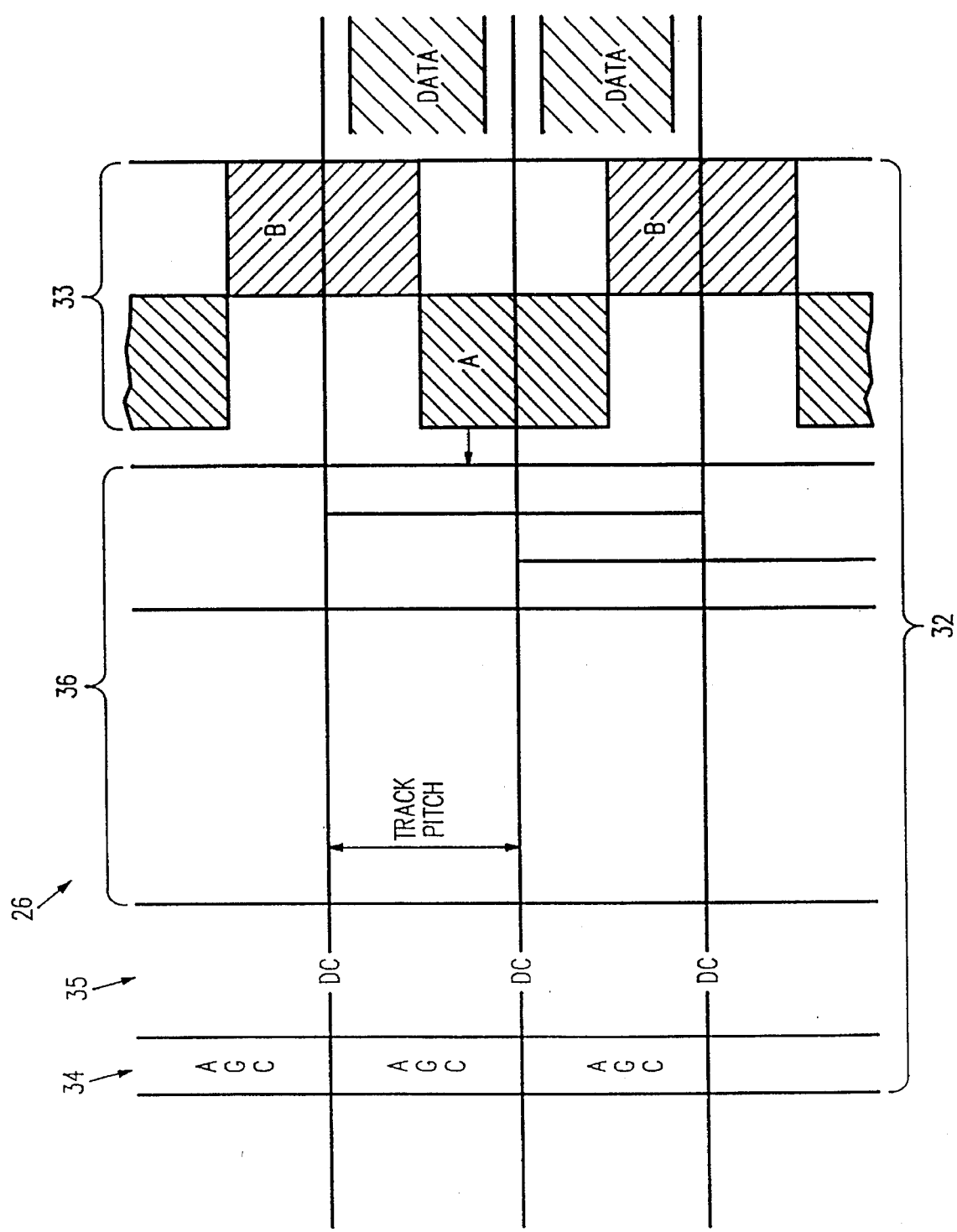
FIG. 3 is a schematic diagram illustrating the servo pattern provided in the servo information sector of a recording data surface.

Referring now to FIG. 3, there is shown a schematic diagram illustrating the servo pattern provided in the servo information sector 32 of a recording data surface 26. The servo pattern is composed of four sections: an automatic gain control (AGC) preamble 34; a Servo Sync Field 35; a Digital Gray Code 36; and a Position Error Signal (PES) A/B burst portion 33. The AGC preamble 34 provides a full amplitude signal coherently written across tracks for providing automatic gain control of the readback signal. The Servo Sync Field 35 provides a unique frequency which enables the digital processing electronics to synchronize to the information in the digital Gray Code 36. The Servo Sync Field 35 may be as simple as a DC erase gap, as indicated in FIG. 3. The digital Gray Code 36 includes digital encoding of such information as inner and outer guardband track regions, absolute cylinder number, and index and sector mark. The PES A/B burst portion 33 provides a linear PES voltage which is a measure of the offtrack position of the head reading that voltage.

Every servo sample provides information identifying the track, along with an analog component that identifies when the head 23 is to the left or to the right of track center. This analog component is derived from the constant frequency PES A/B burst portion 33. When the constant frequency bursts of servo patterns A and B are read as the disk revolves under the head, the head reads a portion of A and a portion of B. Signals A and B are demodulated and an amplitude comparison is made. The amplitude of A relative to the amplitude of B represents off-track positioning in either a positive or a negative direction. As the head moves across the tracks, the difference between the amplitude of the A burst and the amplitude of the B burst produces a difference signal called the PES. When the PES is zero, the head is on track center.

The Gray Code has encoded in it the address of the track. Upon arrival of the head on the track, verification is received that it is on the desired track. Once positioned on the track, the A-B burst information is used for track following. It will be seen that instead of continuous PES information being generated from the disk surface 26, position samples are obtained once every servo information sector 32.

While a specific servo signal format for a disk has been shown, it should be understood that other well known varieties of servo signal format may also be used, if desired.

Figure 4:
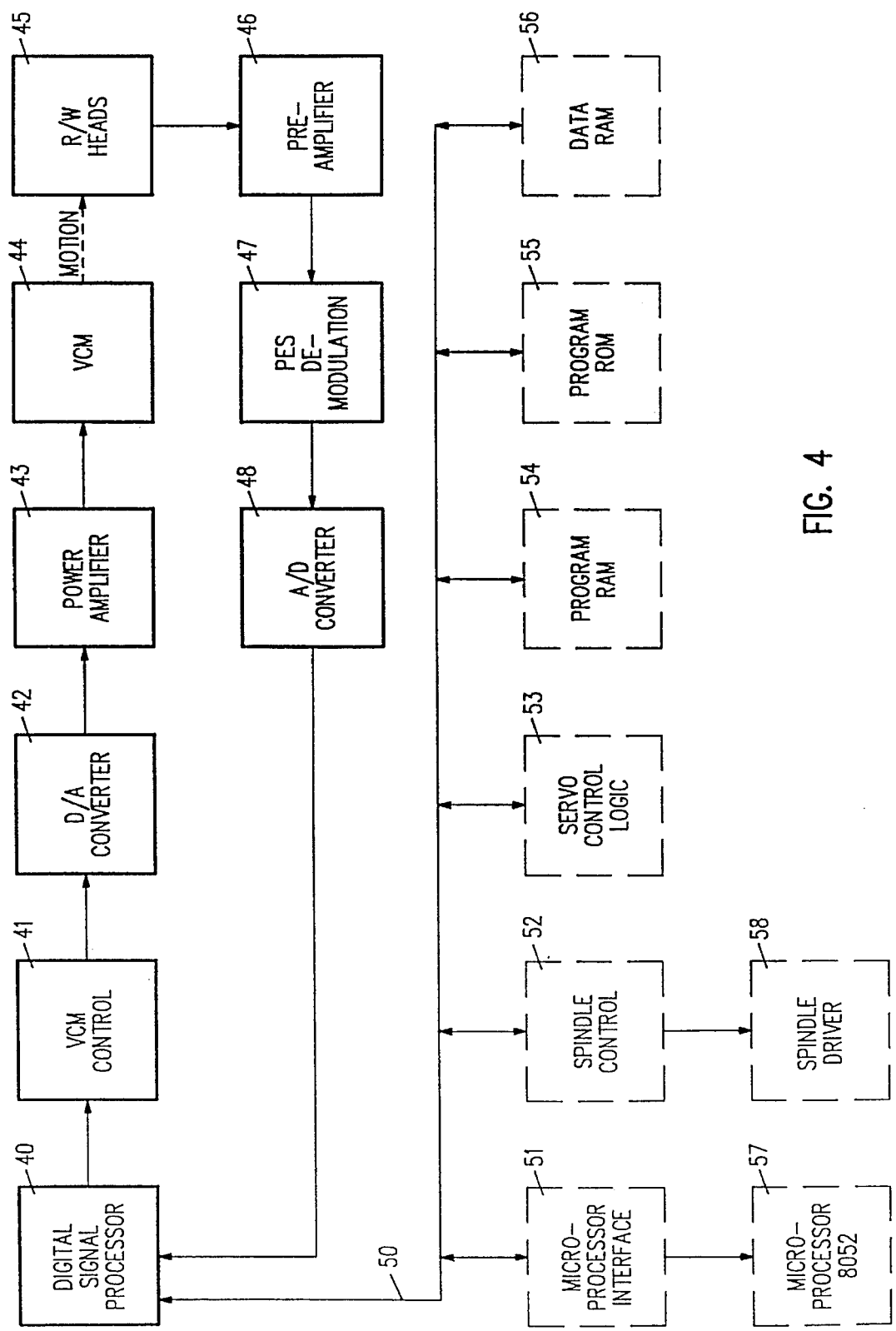
FIG. 4 is a schematic block diagram of a disk drive digital sector servo showing the best mode for carrying out the invention.

Referring now to FIG. 4, there is shown a functional block diagram of a digital sector servo embodying the best mode for carrying out the invention. The servo loop comprises a digital signal processor 40, a VCM control 41, a D/A converter 42, a power amplifier 43, a VCM 44, the VCM 44 being mechanically coupled to provide motion to R/W heads 45 the R/W heads 45 being coupled through a pre-amplifier 46 to a PES demodulation unit 47, the output of which is coupled to an A/D converter 48 whose output is coupled back to the digital signal processor 40. The digital signal processor 40 is coupled by means of a bus 50 to a microprocessor interface 51, a spindle motor control 52, a servo control logic unit 53, a program RAM 54, a program ROM 55, and a data RAM 56. The microprocessor interface 51 is connected to a microprocessor 57 which may be a Motorola 8052 microprocessor. The spindle motor control 52 is connected to a spindle driver 58. The digital signal processor chip 40 may be a TMS 320C10 core. The digital signal processor 40 the VCM control 41, the D/A converter 42, the power amplifier 43, the A/D converter, the microprocessor interface 51, the spindle control 52, the servo control logic 53, the program RAM 54, the program ROM 55 and the data RAM 56 may all be located on one chip referred to as a glue chip. Certain elements in FIG. 4 are shown in dashed line format to indicate that they are extraneous to the servo control loop.

In operation, the heads 45 pick up the signals recorded on the disk and they are amplified in the pre-amplifier and applied to the PES demodulator 47. The PES demodulator 47 detects the amplitude of the A/B bursts, makes a comparison of the A/B bursts amplitudes and provides a PES position error signal to the analog A/D converter 48. The A/D converter changes the PES signal to a digital signal and applies it to a signal processor 40. In addition, digital read data which includes the Servo Sync Field 35 and the Gray Code 36 is also applied to the digital signal processor 40. The digital signal processor 40 develops a control signal that is applied to the VCM control unit 41. The control signal is amplified and is applied to the D/A converter 42 where it is converted into an analog signal. The control signal is then amplified in the power amplifier 43 and applied as a control current to the VCM 44 to drive the PES signal to zero.

Figure 5:
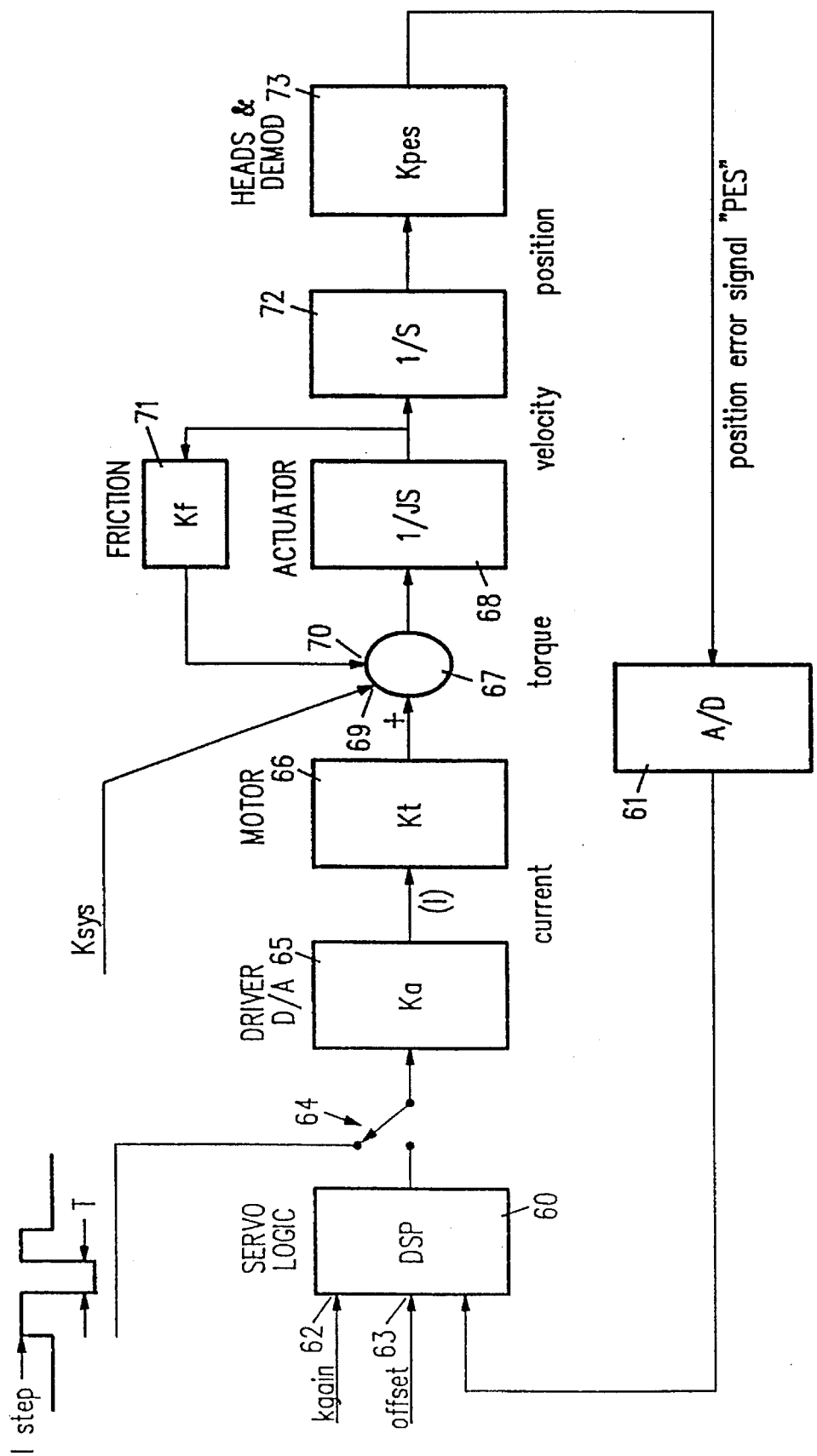
FIG. 5 is a schematic block diagram of the disk drive digital sector servo of FIG. 4 illustrating functionally the operation of the digital sector servo during calibration thereof.

Referring now to FIG. 5, there is shown a schematic block diagram of the disk drive digital sector servo of FIG. 4. FIG. 5 illustrates functionally the operation of the digital sector servo when the calibration system of the present invention is in use. Block 60 represents the digital signal processor. The DSP 60 is shown as having an input from the A/D converter 61 and input labelled kgain 62 and an input labelled offset 63. The kgain input 62 is used by the DSP 60 to correct for variation in measured system gain. A software switch 64 opens the servo loop and applies a current step to the input of the driver digital to analog converter 65. The driver D/A converter 65 is labelled Ka to indicate that it represents the gain of the D/A converter 65. The current step I is applied to the motor 66 which has a label in FIG. 5 of Kt to indicate the torque constant of the motor 66. A summing junction 67 is shown between the motor 66 and the actuator 68. The summing junction 67 is shown as having three inputs. The first input is the output of the motor 66, the second input is Ksys which is the system bias and windage acceleration factors 69, and the friction which is the viscous friction constant Kf 70. The output of the summing junction 67 is the resultant which is input to the actuator 68. The actuator 68 is identified as one over JS. The viscous friction constant Kf is indicated by a box 71 which extends from the output of the actuator to the summing junction 67. The output of the actuator is indicated as a box labelled 1/S 72. The output of box 72 is input to a box 73 which is labeled Kpes. This represents the gain of the heads and demodulator. The output of the box 73 is a position error signal PES which is coupled to the A/D converter 61.

Microstep Calibration

The prior art calibration system involved injecting a sinusoidal signal into the servo while the servo loop was closed. It is a feature of the present invention that calibration takes place under open loop conditions. During calibration using the technique of the present invention, the computer code that controls the servo system opens the servo loop by means of the software switch 64, referred to hereinabove. The implementation of such software switches is well known to those skilled in the art.

In the calibration system of the present invention, gain is measured using a small incremental motion of the read/write head. This motion is caused by a fixed integral of acceleration consisting of a fixed current step applied to the VCM for a predetermined length of time. The method used in the calibration is an open loop fixed acceleration with a measurement of the resulting change of position, or delta. The method of the present invention uses the servo to provide a stabilized start position and to recover from the open loop step. The small incremental motion may be repeated at several angular positions on the same track until the average of the motions represents a good approximation of the system gain.

Figure 6:
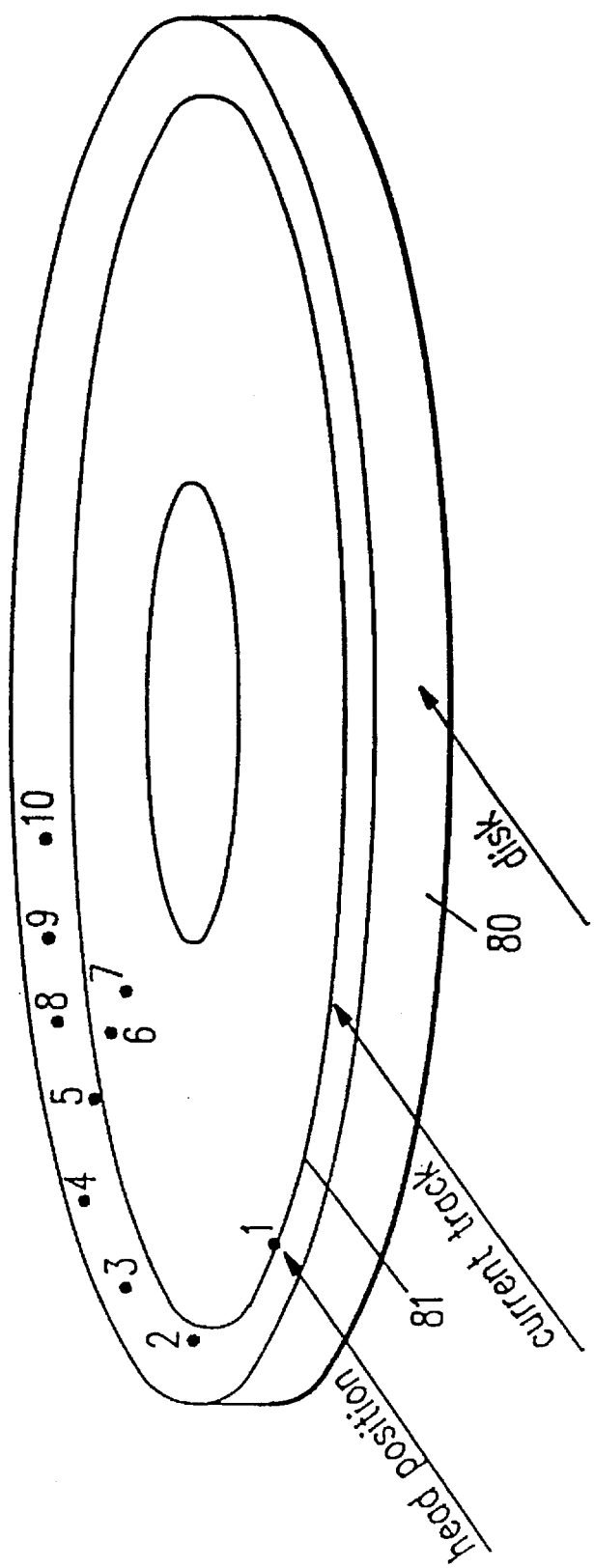
FIG. 6 is a perspective view of a disk illustrating the sequential positions of the head during one microstep measurement.

Referring now to FIG. 6, there is shown a perspective view of a disk 80 illustrating the sequential positions of the head during one microstep measurement. The head (not shown) is in track follow mode following a track 81 illustrated in FIG. 6. The head is at head position 1 at the center of the track initially. An offset command is applied at the offset input 63 shown in FIG. 5 as being applied to the digital signal processor 60. The offset command causes the servo to move the head slightly off center. This is indicated in FIG. 6 by positions 2 and 3. Then the servo is disabled by opening the software switch 64 shown in FIG. 5 at the output of the digital signal processor 60. After the servo is disabled, the position delta of the head is recorded. This is the delta between position 3 and position 4. Then a current step, labeled Istep, is applied to the software switch 64 as shown in FIG. 5. The current causes the actuator 68 to move the head from position 4 through position 5 to position 6. Two steps of VCM current are applied to recover to the offset position. This is indicated in FIG. 6 by the movement of the head to position 7, and then to position 8. The software switch 64 is then closed with the offset still applied, and the offset position is re-established. This is indicated by head positions 9 and 10 in FIG. 6. The two deltas, the first delta 3–4, and the second delta 4–6, are used to determine the system gain. This measurement is repeated several times at different angular positions on the same track 81 to improve the accuracy.

TABLE 1

SEQUENCE OF EVENTS FOR ONE MEASUREMENT

| HEAD POSITION | DESCRIPTION |
|---|---|
| 1.. | Head at the center of the track in "track follow mode". |
| 2..3 | Offset command causes servo to move head slightly off center. |
| 3..4 | Servo is disabled and position delta of head is recorded. "DELTA_3–4". |
| 4..6 | Servo is still disabled and a step of current is applied to the VCM. Position delta is taken "DELTA_4–6". |
| 7..8 | Servo is still disabled and two steps of VCM current are applied to recover to the offset position. |
| 9..10 ... | Servo is enabled with the offset still applied and offset position is reestablished. |

The sequence of events for one measurement is shown in Table 1.

Figure 7:
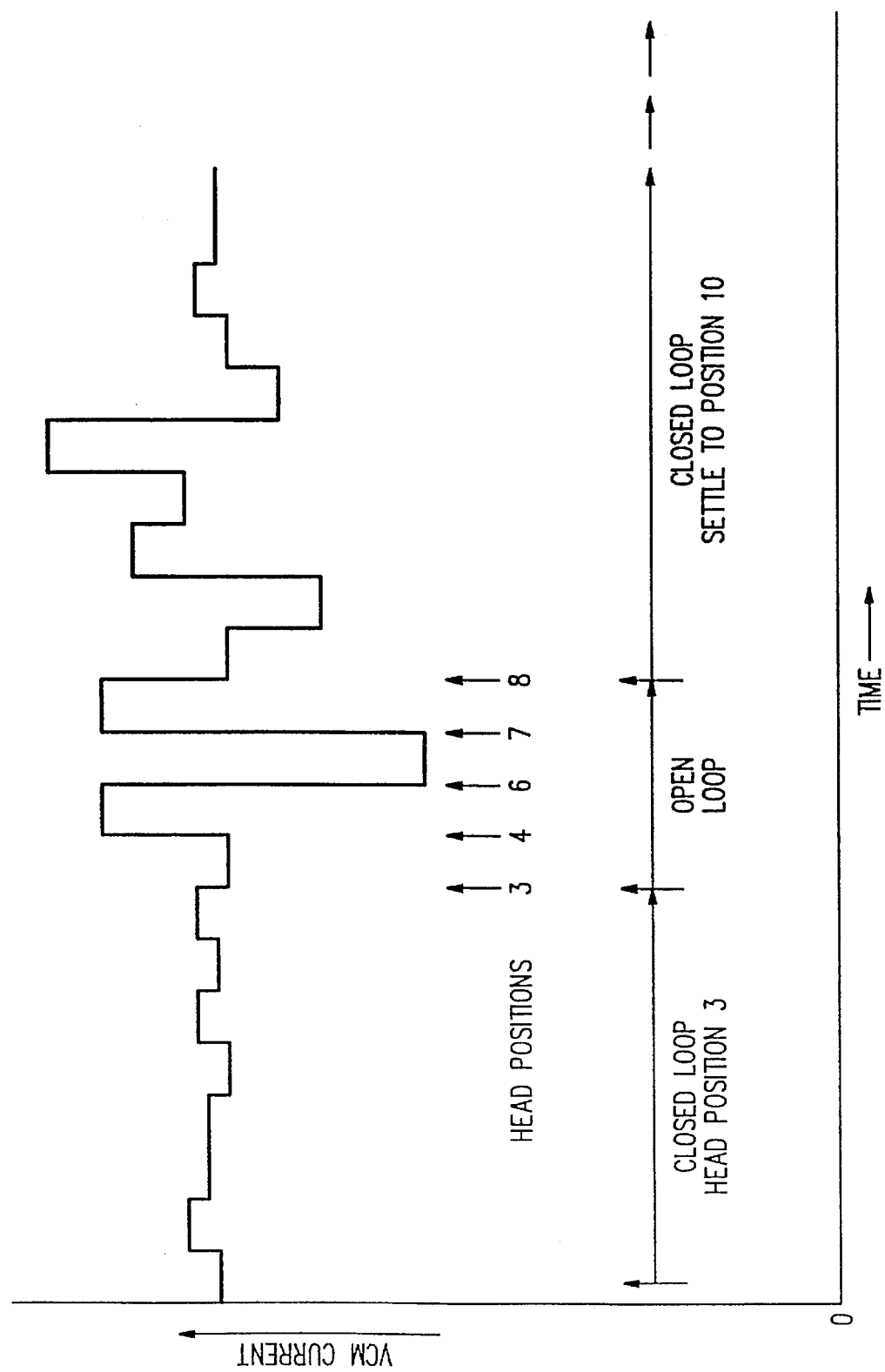
FIG. 7 is a graph of voice coil motor (VCM) current versus time, showing the relationship of the VCM current to the sequential positions of the head shown in FIG. 6.

Referring now to FIG. 7, there is shown a graph of voice coil motor current versus time showing the relationship of the VCM current to the sequential positions of the head as shown in FIG. 6 and as listed in Table 1. The VCM current is along the ordinate of the graph of FIG. 7 and the time is along the abscissa. As indicated in FIG. 7, the servo is operating as a closed loop because the software switch 64 is closed up until head position 3. The servo operates open loop from head position 3 to head position 8. At head position 8 the software switch 64 is closed and the servo operates closed loop up to head position 10.

The fundamental concept of the microstep calibration technique is based on the simple relationship between the change of position as a function of a fixed torque applied for a fixed time. In this situation, the position delta is the result of several constants, the gain of a voice coil motor (VCM) and the PES gain.

Referring back to FIG. 5, the system block diagram shows how the technique is applied. The parameters of FIG. 5 are defined as follows:

TABLE 2

DEFINITION OF PARAMETERS

- kgain — used by the DSP to correct for variation in measured system gain
- Istep — input signal creating the microstep and the recovery steps.
- T — fixed time
- Switch — software switch used to open the control loop during the istep input.
- Ka — gain of the D/A converter
- Ksys — system bias and windage acceleration factors.
- Kt — torque constant of the motor
- J — current applied to the (VCM)
- Kf — viscous friction constant
- Kpes — gain of the PES
- S — complex variable The gain determination method is as follows: The unknown gain in the system block diagram of FIG. 5 includes all of the elements from the Ka block 65 to the Kpes block 73. When Ksys and Kf are ignored, the unknown gain is Ka*KT*Kpes. Ksys and Kf can be ignored or eliminated by using the techniques described below, thus making the derivation of system gain simpler.

Friction (Kf) and accelerations such as windage and flex cable bias also affect the motion. These factors are not directly included in the equation because their effects are reduced by the following techniques.

Friction effects (Kf) are minimized by utilizing the largest possible step current. The large torque created by the large current causes the ratio of friction to applied torque to be very small. This small ratio minimizes the error caused by ignoring the friction in the motion equation. This approach is limited by the minimum time and maximum range of the PES. Friction pre-calibration may also be used, if desired, as an enhancement.

The system bias and windage acceleration factors are grouped as Ksys. Ksys is accounted for by measuring the position delta with zero current applied and using the measured delta in the subsequent step acceleration calculation. In the head position diagram of FIG. 6, zero current is applied from head position 3 to head position 4. Position change delta, "DELTA–3–4", between these positions is the zero current delta that is used. The equations below justifies the use of this delta to eliminate Ksys. Solving for the PES delta from the system block diagram of FIG. 5:

PES delta=$Kpes*(T^2/2)*(Istep*Ka*Kt-Kf*velocity-Ksys)/J$

Kf times velocity is ignored due to the high ratio of (Kt * Istep )/Kf and the Kpes and Ksys terms are factored out in the equation below.

PES delta=$Kpes*(T^2/2)*((Istep*Ka*Kt/J)-(Ksys/J))$

Approximation By Superposition

When the current "I" is zero, the only effect on PES delta is:

PES delta=$-Kpes*(T^2/2)*Ksys/J$

Since "I", is zero during the DELTA_3–4 time of FIG. 7, then the following relationship holds:

$DELTA\_3\text{--}4=-Kpes*(T^2/2)*Ksys/J$

The time "T", in all of the equations is the constant sampling time, and since this time is equal, the following substitution can be made when solving for the PES delta during the application of the "I step" current. This delta is represented in FIG. 6 as Delta_4–6.

$DELTA\_4\text{--}6=Kpes*(T^2/2)*Istep*Ka*Kt/J + DELTA\_3\text{--}4$

Solving for gain:

$Kpes*Ka*Kt=[(DELTA\_4\text{--}6-DELTA\_3\text{--}4)*J]/(Istep*(T^2/2))$

Referring to FIG. 5, the kgain input 62 to the DSP 60 is used as a correction factor based on the above measured gain. The unmodified kgain input 62 is used in the DSP control equations to get a desired closed loop bandwidth when the above gain is nominal. When the gain is not nominal, a corrected kgain is derived as follows to keep the closed loop bandwidth independent of gain.

kgain (corrected)=(nominal)Kpes*Ka*Kt*kgain/measured gain

In practical systems, noise can be a problem. The signal to noise ratio has decreased on the small drives making it more difficult to get reliable gain readings. Accordingly, innovative techniques have been devised to make the microstep calibration of the present invention practical on the small drives. These innovations are listed below.

Technique Number One

The step time is made equal to the shortest possible time (one sector in this case). This gives the best signal to noise performance by maximizing the ratio of applied torque to system noise.

Technique Number Two

The gain derivation depends on a linear relationship between the head displacement and the PES output. Linear range of the PES is limited to an area near the center of the track. A technique was devised to eliminate some of the PES delta variation. The technique utilized a prior calibration that was required for the torque gain. The torque calibration is used as a prescalar for the size of the microstep acceleration. This "prescale" allowed the "microstep" to be larger without exceeding the linear range of the PES.

Technique Number Three

Data averaging is accomplished by taking eight measurements, sorting them by magnitude and then averaging only the center four. This center four technique was developed empirically and works better than an average of all eight measurements.

Technique Number Four

Controlled position progression was added to further reduce noise. The eight samples taken for the average above are taken at specific locations keyed off index, and each calibration is taken at eight consecutive sector locations. This method targets the noise that was written in by the servo writer. The written noise is permanent in location and has a repeatable frequency spectrum.

After a detailed study it was determined that an averaged advancing sector PES calibration could eliminate the effect of this "fixed noise".

Technique Number Five

In systems with wide gain variations, the stability of the servo loop can be bad enough to prevent seeking to a track to perform calibration. The method used for calibration in accordance with the present invention requires the servo to have the ability to seek. Accordingly, in order to include very large gain variations, the method of the present invention has been enhanced with a low performance seek algorithm. The low performance method is used until the gain is corrected by calibration. After calibration is successfully completed, the high performance seek algorithm is enabled. This technique allows for operation at very large gain variations, and insures data access in the extreme case when calibration can not be completed.

Figure 8:
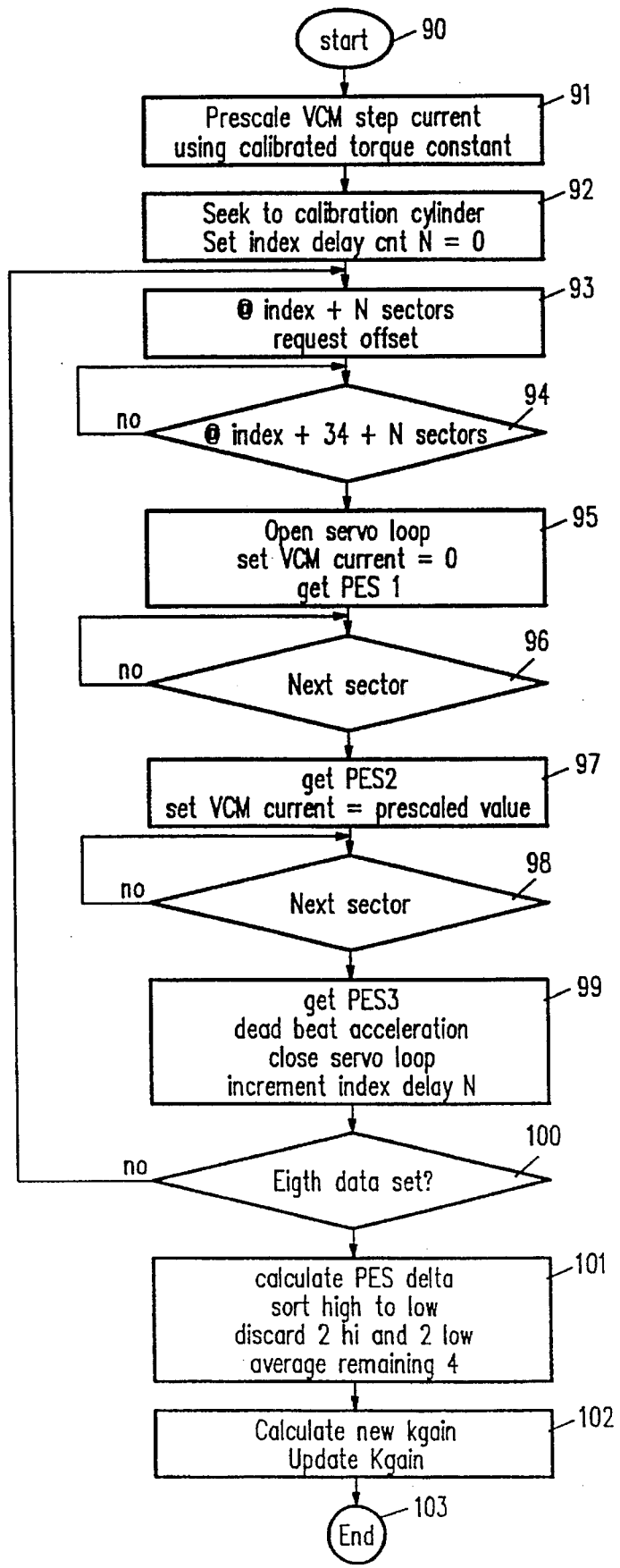
FIG. 8 is a flow chart diagram illustrating the microstep calibration process of the present invention.

Referring now to FIG. 8, there is shown a flow chart diagram illustrating the microstep calibration process of the present invention. Circle 90 indicates the start of the micro step calibration process. Block 91 is the first step. It calls for prescaling the VCM step current using calibrated torque constant. This relates to Technique No. 2 referred to hereinabove. Technique No. 2 utilized a prior calibration that was required for the torque gain. The torque calibration is used as a prescalar for the size of the micro step acceleration. This prescale allowed the microstep to be larger without exceeding the linear range of the PES.

The next step is in block 92. Block 92 calls for having the system seek to the calibrations cylinder. It then sets the index sector delay count to N=0. Block 93 waits for index plus N sectors, and then requests offset. The next step is a decision step 94. It asks if it is at the index plus 34 sectors. If the answer is yes, it goes on to 95. If the answer is no, it goes back to the beginning of 94. Step 95 opens the servo loop by operating the software switch 64 of FIG. 5. Step 95 also sets the VCM current to zero and gets PES 1. The next step is a decision step 96. It asks if the servo has reached the next sector. If the answer is yes, then it goes on to step 97. If the answer is no, it goes back to the beginning of step 96. Step 97 calls for the operation of getting PES 2. It then sets the VCM current to the prescaled value. The next step is a decision step 98. It asks if the next sector has been reached. If the answer is yes, it goes on to step 99. If the answer is no, it returns to the beginning of step 98. Step 99 calls for getting PES 3. Then dead beat acceleration is obtained. Then the servo loop is closed by operating the software switch 64 of FIG. 5. Increments of the index delay end is then obtained. The next step is a decision step 100. It asks if this is the eighth data set. If the answer is yes, it goes on to step 101. If the answer is no, it goes back to the beginning of Step 93. Step 101 is to calculate PES delta. It sorts high to low. It discards the two high readings and the two low readings. It averages the remaining four readings. Step 102 is to calculate the new Kgain and update Kgain. Step 103 is the end of the process.

The microstep calibration method of the present invention operates twelve times faster than the method it replaces. It is capable of operating much faster and improvements are planned to give speeds 80 times faster than the previous method. These high speed calibrations are increasingly important as availability from power up, power consumption, and servo performance continue to place higher demands on the calibration performance.

The system of the present invention solves the problems of the prior sinecal approach with less complexity in the implementation and it's design is independent of the track follow servo. The time required to calibrate one position is 0.125 seconds, 12 times faster than the "Sinecal" method.

The method used in the microstep calibration of the present invention is an open loop fixed acceleration with a measurement of the resulting position delta. This method uses the servo to provide a stabilized start position and to recover from the open loop step. These servo functions have almost no effect on the calibration and thus the development of calibration is independent of the servo design.

The servo is implemented primarily in a digital signal processor, "DSP". A significant amount of DSP code was required for the "sinecal" method because this method performed it's measurement with the servo in a "closed loop" state. The new "microstep" method of the present invention requires only a minor amount of DSP code due to its' "open loop" operation. This frees up a significant amount of the DSP code space.

It is to be understood that the above-described embodiment is merely illustrative of some of the many specific embodiments which represent applications of the principles of the present invention. Clearly, numerous variations can be readily devised by those skilled in the an without departing from the scope of the invention.

What is claimed is:

1. In a control system for a disk storage device comprising an electro-mechanical actuator, at least one storage disk, at least one read/write head proximate said disk, said read/write head being mechanically linked to said actuator, and a control system comprising a servo loop and a digital signal processor;

a method of determining a calibrated system gain adjustment factor, said method comprising the steps of:

commanding said actuator to an offset position with a control signal;

opening said servo loop;

applying a fixed current step to said actuator for a predetermined length of time to cause an incremental motion of said read/write head;

measuring the resulting change of position of said read/write head;

closing said servo loop so that said control system may be used to recover from the open loop fixed current step; and determining a calibrated system gain adjustment factor, said factor being a function of said change of position of said read/write head in response to said open loop fixed current step.

2. A method of determining a calibrated system gain adjustment factor as in claim 1 further comprising the step of repeating the foregoing steps for each read/write head.

3. A method of determining a calibrated system gain adjustment factor as in claim 1 further comprising the step of repeating the foregoing steps for several times at different angular positions on the same track to improve the accuracy.

4. A method of determining a calibrated system gain adjustment factor as in claim 1 further comprising the step of repeating the foregoing steps eight times to obtain eight measurements, sorting said eight measurements by magnitude, eliminating the first two measurements and the last two measurements and then averaging only four measurements in the middle of said eight measurements to accomplish data averaging.

5. In a control system for a disk storage device comprising an electro-mechanical actuator, at least one storage disk, at least one read/write head proximate said disk, said read/write head being mechanically linked to said actuator, and a control system comprising a servo loop and a digital signal processor;

a method of calibrating system gain by determining a system gain adjustment factor, said method comprising the steps of:

commanding said actuator to an offset position with a control signal;

opening said servo loop;

applying a fixed current step to said actuator for a predetermined length of time to cause an incremental motion of said read/write head;

measuring the resulting change of position of said read/write head;

closing said servo loop so that said control system may be used to recover from the open loop fixed current step;

determining a new calibrated system gain adjustment factor, said factor being a function of said change of position of said read/write head in response to said open loop fixed current step;

replacing a previous system gain adjustment factor by said new calibrated system gain adjustment factor; and multiplying said control signal by said new calibrated system gain adjustment factor to obtain an adjusted control signal.

6. A method of calibrating system gain by determining a system gain adjustment factor as in claim 5 wherein said control system includes a selectable low performance calibration system and a selectable high performance calibration system, said method comprising: initially selecting and enabling said low performance calibration system until said control system gain is corrected by calibration; and then selecting and enabling said high performance calibration system.

* * * * *